Oct. 10, 1961  E. F. MACKS  3,004,180
FLUID SUPPORTED ROTOR
Filed April 23, 1956
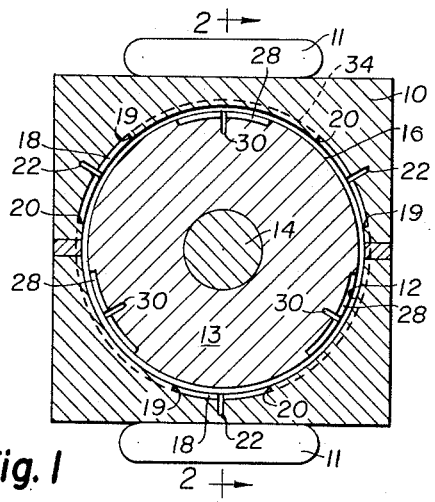
Fig. 1
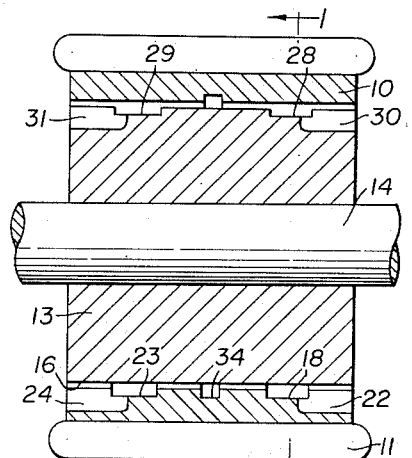
Fig. 2
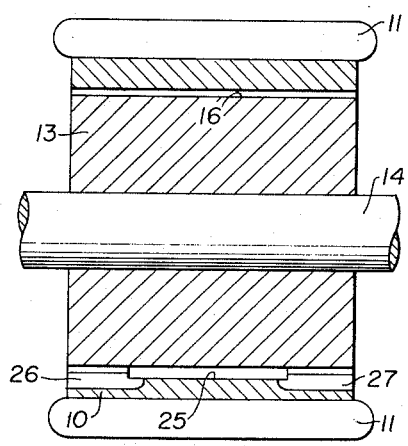
Fig. 3
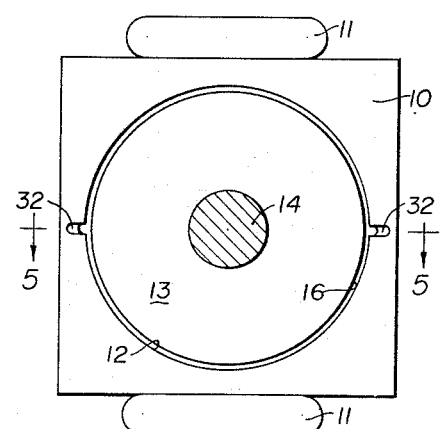
Fig. 4
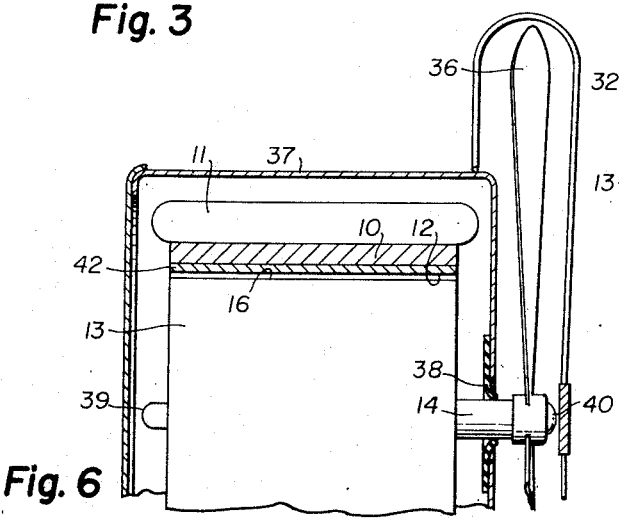
Fig. 5
Fig. 6
INVENTOR.
ELMER FRED MACKS
BY Pyle and Fisher
ATTORNEYS

United States Patent Office 3,004,180
Patented Oct. 10, 1961

3,004,180
FLUID SUPPORTED ROTOR
Elmer Fred Macks, Vermilion, Ohio, assignor, by direct and mesne assignments, to Air-Glide, Inc., Cleveland, Ohio, a corporation
Filed Apr. 23, 1956, Ser. No. 580,133
17 Claims. (Cl. 310—90)

This invention relates to dynamoelectric devices, and more particularly to electric motors, generators, converters, and dynamometers wherein a load carrying fluid dynamic film is formed between two closely spaced, relatively moving elements.

In my copending application for patent entitled "Fluid Supported Rotor" bearing Serial No. 558,676, filed January 12, 1956, now abandoned in favor of a continuation-in-part application Serial No. 714,454, filed January 28, 1958, the broad principles of a dynamoelectric device of the type contemplated by the present invention have been disclosed. This application is a continuation-in-part of that application disclosing certain improvements and refinements.

It has been discovered that if a smooth cylindrically contoured bore is provided in a stator and a smooth cylindrically contoured external surface is provided on a rotor, the rotor may be supported in the stator for free, substantially frictionless rotation even with ambient air as the lubricant. This is achieved by providing a precision running fit between the cylindrically contoured surfaces which are provided with a clearance from 0.00005 inch per inch of diameter to 0.003 inch per inch of diameter depending upon the application. As the elements are relatively rotated, a load carrying fluid film is produced between the elements and the rotor is wholly supported radially in spaced relationship with the stator on such fluid film. These principles have been disclosed in the above referenced patent application.

It has also been discovered that the pressure characteristics of the fluid dynamic supporting film may be improved for certain operating conditions by providing a plurality of spaced depressions in one or both of the confronting surfaces.

It is, then, one of the principal objects of this invention to provide a load carrying fluid dynamic film in a dynamoelectric device having a fluid supported rotor through the provision of a plurality of spaced depressions which form stepped convergences.

An additional object of this invention is to provide a dynamoelectric device in which the rotating element is supported on a load carrying film of gas having improved pressure characteristics.

Yet another object of this invention is to provide a mechanism having a plurality of such depressions in one of the confronting surfaces and a plurality of fluid supply grooves communicating with the depressions to facilitate the entry of fluid into the depressed areas.

A further object of this invention is to provide a device in which a plurality of pairs of circumferentially spaced depressions are provided and in which the depressions of each pair are longitudinally spaced to provide enhanced inherent stability and resistance to dynamic and misalignment forces tending to cause binding of the rotor in the stator.

Yet another object of this invention is to provide a device in which three or more axially spaced depressions are provided and in which those axial sets of depressions are repeated about the circumference to provide improved load carrying and stability characteristics.

In prior known devices employing fluid dynamic films, one of the principal handicaps has been the presence of dirt and impurities. With close tolerances a build-up of foreign particles can materially affect the operating characteristics. It has further been discovered that this disadvantage may be substantially overcome by providing dirt grooves longitudinally disposed in one of the confronting surfaces.

It is, then, a further object of this invention to provide a mechanism wherein one or more longitudinally disposed dirt grooves are provided.

Yet another and more specialized object of this invention is to provide a dynamoelectric device having one or more of the foregoing objects and a layer of solid lubricant laminated on one of or both of the confronting surfaces to provide lubrication upon starting and stopping.

Other objects and a fuller understanding of the invention may be had by referring to the following description and claims, taken in conjunction with the accompanying drawing, in which:

FIGURE 1 is a schematic sectional view as seen from the plane indicated by the line 1—1 of FIGURE 2, showing a motor in which depressions and fluid supply grooves have been formed in the rotor;

FIGURE 2 is a sectional view as seen from the plane indicated by the line 2—2 of FIGURE 1, of the device of FIGURE 1;

FIGURE 3 is a sectional view as seen from the plane indicated by the line 2—2 of FIGURE 1, showing a dynamoelectric device wherein the depressions are centrally spaced, longitudinally speaking;

FIGURE 4 is a schematic plan view of the motor wherein a plurality of dirt grooves are formed in the stator;

FIGURE 5 is a sectional view as seen from the plane indicated by line 5—5 of FIGURE 4, of the device of FIGURE 4; and, FIGURE 6 is a sectional view of a fan having a motor made in accordance with the present invention.

Referring to the drawing, a stator element is indicated schematically at 10. A pair of magnets 11 are provided to induce a magnetic field in the stator 10. In the preferred embodiment of the invention the stator 10 has a cylindrically contoured inner surface 12 which is machined to close tolerances, as is disclosed in more complete detail in the above referenced copending application for patent. A rotor element 13 is provided. The rotor 13 has a shaft 14 connected to it to transmit rotational forces to the object to be driven. The rotor has a smooth external cylindrically contoured surface 16. The surface 16 is formed to tolerance comparable to the tolerances of the surface 12 and the surfaces are in close complemental running fit. In the preferred form of the device one or both of the surfaces is substantially uninterrupted to provide high load carrying capacity. This may be accomplished by providing a sleeve on one or both of the elements if the elements are segmental rather than uninterrupted. Such a sleeve is shown at 42 of FIGURE 6.

In the embodiment of FIGURES 1 and 2 a plurality of depressions 18 are formed in the stator. For clarity of illustration the dimensions of the depressions have been greatly exaggerated. In actual practice these depressions are areas which have a surface which need be only in the neighborhood of 0.000040 inch to 0.003 inch beneath the stator surface 12. The exact depth of the depressed areas depends upon the operating conditions and ambient fluid.

As the rotor 13 rotates relative to the stator 10, fluid tends to adhere to the surface of the rotor. Thus, as the rotor of FIGURE 1 rotates clockwise, fluid tends to move out of the depressions at steps 19 into an area of lesser radial dimension. Thus, fluid pressure is built up through convergence over the steps 19. If the rotor 13 of FIGURE 1 is rotated in a counter-clockwise direction relative to the stator 10, the same phenomenon occurs at steps 20.

A plurality of fluid supply grooves 22 may be provided to facilitate the ingress of fluid into the depressions 18. In the embodiment shown in FIGURE 1 the supply grooves are located substantially at the midpoint of depressions 18. This is to permit the grooves to function when the rotor is rotating in either direction. If a motor having a single direction of rotation is provided, the fluid supply grooves 22 may be located at one end of the depressions 18. Thus, for example, if rotor 13 of FIGURE 1 rotates only in a clockwise direction, the fluid supply grooves 22 would be located near the step or shoulder 20.

Referring to FIGURE 2, it will be seen that the depressions 18 are as seen in that drawing at the right hand side. A plurality of corresponding depressions 23 and supply grooves 24, only one of each being shown, are formed in the stator 10 at the left hand side with respect to FIGURE 2. Thus it may be seen that the depressions 18, 23 are arranged in longitudinally spaced pairs. The pairs of depressions are angularly spaced at approximately 120 degrees as is readily apparent in FIGURE 1. In general the depressions do not extend axially to the outer edge but have end leakage compensation.

The longitudinal spacing of the pairs of depressions 18, 23 provides inherent stability in the fluid supporting film by creating longitudinally spaced areas of relatively high fluid film pressure to resist any forces which may result from a dynamic unbalanced condition, misalignment or the like.

The provision of three or more angularly spaced depressions, as seen in FIGURE 1, provides increased film concentration at spaced points in order to resist any tendency of the rotor to move in any radial direction. In a gas bearing, some load support is due to the negative pressure in the thick film region. Thus, for the arrangement of FIGURE 1, but for a rotor without recesses, negative pressure in the top portion helps to support any downward rotor load.

A circumferentially extending bleed groove 34 is disposed midway between the depressions 18, 23. The bleed groove 34 serves to limit the tendency of fluid pressure to bleed from the region of one of the depressions to the region of the other.

In FIGURE 3 the depression is indicated as 25 and is centrally located, longitudinally speaking. The depression 25 may, of course, be one of a plurality of depressions which are circumferentially disposed in the same relationship as the depressions 18 of FIGURE 1. In this embodiment a pair of fluid supply grooves 26, 27 are provided to maximize the ingress of fluid to the depressions 25. Depressions may be provided on either of the motor elements, that is, the rotor 13 or the stator 10, or on both of the elements to provide the required load carrying fluid dynamic film characteristics for a given application. Preferably the depressions are formed in the outer of the two element surfaces. Further, they may be provided in longitudinally spaced pairs, or groups of a higher number, or again, longitudinally speaking, individually.

In FIGURES 1 and 2 a plurality of depressions or recesses 28 are formed in the surfaces of the rotor 13. In FIGURE 2 a longitudinally spaced depression 29 is shown. A corresponding depression is formed in longitudinally spaced relationship with each of the depressions 28. Fluid supply grooves 30, 31 communicate with the depressions 28, 29 respectively. The depressions 28, 29 and the grooves 20, 31 correspond in shape and function to the previously disclosed depressions or recesses 18, 23, 25 and supply grooves 22, 24, 26, 27.

One purpose of the depressions is to provide inherent stability under high values of the so-called Sommerfeld number. The appropriate design can be determined by first calculating the Sommerfeld number. This number is determined by solving the formula which is the quantity $$\left(\frac{r}{c}\right)^2 \times \frac{ZN}{P}$$

where $r$ equals the radius of the rotor in inches, $c$ equals the nominal radial clearance between the rotor and the stator in inches, $Z$ equals the absolute viscosity of the fluid lubricant in pound seconds per inch squared, $N$ equals the speed in revolutions per second, and $P$ equals the unit load in pounds per square inch.

In the embodiment of FIGURES 4 and 5 a plurality of grooves 32 are provided. The grooves are located in angularly spaced relationship. The grooves 32 as shown in the drawings are of relatively limited arcuate extent and serve as dirt grooves. These grooves may form substantial interruptions in one or the other of the complemental surfaces 12, 16. As an example, the stator may have three spaced grooves having an arcuate extent of 30° each. The cylindrically contoured surface 12 would then comprise three spaced segments, each of about 60° arcuate extent.

When the rotor is rotating a load carrying fluid film is built up between the rotor and the stator. This fluid film has a varying pressure at different points about its circumference.

In forming the grooves 32, care must be exercised to avoid location of one of the grooves in an area of reduced or negative pressure. In such an area dirt tends to be drawn from the grooves, thus defeating the purpose of the grooves. Preferably, one of the grooves is located in the stator at the edge of the area of highest pressure to permit the pressure to tend to force dirt into the groove and yet the groove does not materially decrease the load carrying capacity of the fluid film.

As may be seen in FIGURE 5 the dirt grooves 32 have a depth which tapers outwardly from a generally longitudinally centered point. Thus, as dirt is collected in the grooves it tends to be forced outwardly and move from the area of the fluid film.

In the embodiment shown in FIGURES 1 through 3 the fluid supply grooves 22, 24, 26, 27 and groove 34 may serve as dirt grooves.

In FIGURE 6 a dynamoelectric device in the form of an electric motor is shown. Here a fan blade 36 is connected to the shaft 14. A housing 37 is provided for the motor. A dust seal 38 may be provided about the periphery of the shaft 14. A thrust bearing which may simply take the form of a stop is provided at 39. If the fan is operated with the axis of rotation substantially horizontal, the magnetic field will hold the fan in position. The thrust bearing or stop 39 is needed, however, to prevent the fan from forcing the rotor from the stator when the motor is stopped. A second thrust bearing 40 may be provided at the other end of the shaft if the fan is to be operated in a non-horizontal position.

Outstanding operating characteristics have been obtained with a fan built in accordance with the disclosure of FIGURE 6. Bearing noise is eliminated. Additionally, vibration is materially reduced. It is believed that this is attributable to the fact that the device is somewhat self-balancing. Since the rotor is not confined to a precise axis of rotation, it is believed that the rotor tends to rotate about its center of mass. This self-balancing feature coupled with the cushioning effect of the load supporting fluid film is believed to provide the outstanding vibrationless results achieved.

A film of solid lubricant such as molybdenum disulfide may be applied to one or both of the surfaces 12, 16 to provide lubrication for starting and stopping of the device.

There has thus been described a device in which dirt catching grooves are provided in one or both of the surfaces of a fluid dynamic film producing device, and there has further been described a fluid dynamic film producing device in the form of a dynamoelectric device in which depressions are appropriately provided to improve the pressure characteristics of the fluid dynamic film and provide inherent stability.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a plurality of circumferentially spaced depressions therein to provide stepped convergences to improve the pressure characteristics of such generated load carrying fluid film, and said first element being a rotor element totally supported radially on said film when the elements are relatively rotating, the fluid in said film being totally supplied by the fluid ambient to the device.

2. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having at least one longitudinally extending dirt groove formed therein, and said first element being a rotor element totally supported radially on said film when the elements are relatively rotating, the fluid in said film being supplied by the fluid ambient to the device.

3. A dynamoelectric device having rotor and stator elements relatively rotatable about a horizontal axis, said elements having confronting cylindrically contoured surfaces in spaced relationship with one another for generating a load carrying fluid dynamic film therebetween on relative rotation about the axis of the surfaces, said stator surface having a plurality of circumferentially spaced depressions therein to provide stepped convergences to improve the pressure characteristics of such generated load carrying fluid film, and said rotor element totally supported radially on said film when the elements are relatively rotating, the fluid in said film being totally supplied by the fluid ambient to the device.

4. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of the elements including means to generate a magnetic field, said fluid film region extending into said field and extending longitudinally about the axis of the rotor, one of said surfaces having at least three circumferentially spaced depressions therein to provide stepped convergences to improve the pressure characteristics of such generated load carrying fluid film, said first element being a rotor element totally supported radially on said film when the elements are relatively rotating, the fluid in said film being totally supplied by the fluid ambient to the device.

5. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a plurality of circumferentially spaced depressions therein to provide stepped convergences to improve the pressure characteristics of such generated load carrying fluid film, said one surface having one or more longitudinally extending fluid supply grooves, each of said grooves communicating with at least one depression, and said first element being a rotor element totally supported radially on said film when the elements are relatively rotating, the fluid in said film being totally supplied by the fluid ambient to the device.

6. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, the stator having at least one longitudinally extending dirt groove formed therein, and said first element being a rotor element totally supported radially on said film when the elements are relatively rotating, the fluid in said film being supplied by the fluid ambient to the device.

7. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a plurality of dirt grooves formed therein, and said first element being a rotor element totally supported radially on said film when the elements are relatively rotating, the fluid in said film being supplied by the fluid ambient to the device.

8. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of the elements including means to generate a magnetic field, said fluid film region extending into said field and extending longitudinally about the axis of the rotor, one of said surfaces having a plurality of circumferentially spaced pairs of depressions therein to provide stepped convergences to improve the pressure characteristics of such generated load carrying fluid film, the depressions of each pair being longitudinally spaced, and said first element being a rotor element totally supported radially on said film when the elements are relatively rotating, the fluid in said film being totally supplied by the fluid ambient to the device.

9. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, each of said surfaces having a depression formed therein to provide stepped convergences to improve the pressure characteristics of such generated load carrying fluid film, and said first element being a rotor element totally supported radially on said film when the elements are relatively rotating, the fluid in said film being totally supplied by the fluid ambient to the device.

10. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of the elements including means to generate a magnetic field, said fluid film region extending into said field and extending longitudinally about the axis of the rotor, one of said surfaces having a plurality of circumferentially spaced depressions therein to provide stepped convergences to improve the pressure characteristics of such generated load carrying fluid film, said first element being a rotor element totally supported radially on said film when the elements are relatively rotating, the average radial distance between said confronting surfaces being from 0.000050 inch to 0.003 inch per inch of diameter, and the radial depth of said depressions being from 0.000040 inch to 0.003 inch, the fluid in said film being totally supplied by the fluid ambient to the device.

11. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having at least one longitudinally extending dirt groove formed therein, said groove being tapered radially outwardly from a generally longitudinally centered point, and said first element being a rotor element totally supported radially on said film when the elements are relatively rotating, the fluid in said film being supplied by the fluid ambient to the device.

12. A dynamoelectric device having first and second elements relatively rotatable about a horizontal axis, said elements having confronting cylindrically contoured surfaces in spaced relationship with one another for generating a load carrying dynamic gas film therebetween on relative rotation about the axis of the surfaces, one of said surfaces having a plurality of circumferentially spaced depressions therein to provide stepped convergences to improve the pressure characteristics of such generated load carrying gas film, and said first element being a rotor element totally supported radially on said film of gas when the elements are relatively rotating, the gas in said film being totally supplied by the ambient atmosphere.

13. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a plurality of circumferentially spaced depressions therein to provide stepped convergences to improve the pressure characteristics of such generated load carrying fluid film, the average radial clearance between said confronting surfaces being from a 0.000050 inch to 0.003 inch per inch of diameter, and said first element being a rotor element totally supported radially on said film when the elements are relatively rotating, the fluid in said film being totally supplied by the fluid ambient to the device.

14. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, the surface of one of said elements having a plurality of circumferentially spaced depressions therein to provide stepped convergences to improve the pressure characteristics of such generated load carrying fluid film, said one element also having a plurality of depression base surfaces, each of the base surfaces defining the radial inward limit of one of said depressions, said base surfaces being imperforate, the radial depth of said depressions being from 0.00004 inch to 0.003 inch, and said first element being a rotor element totally supported radially on said film when the elements are relatively rotating, the fluid in said film being totally supplied by the fluid ambient to the device.

15. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a depression therein to provide a stepped convergence to improve the pressure characteristics of such generated load carrying fluid film, and said first element being a rotor element totally supported radially on said film when the elements are relatively rotating, the fluid in said film being totally supplied by the fluid ambient to the device.

16. A dynamoelectric device having first and second elements relatively rotatable about a horizontal axis, said elements having confronting cylindrically contoured surfaces in spaced relationship with one another for generating a load carrying fluid dynamic film therebetween on relative rotation about the axis of the surfaces, one of said surfaces having a depression therein to provide a stepped convergence to improve the pressure characteristics of such generated load carrying fluid film, said one surface including said depression being imperforate, and said first element being a rotor element totally supported radially on said film when the elements are relatively rotating, the fluid in said film being totally supplied by the fluid ambient to the device.

17. The device of claim 15 wherein the fluid is a gas.

References Cited in the file of this patent

UNITED STATES PATENTS

| | | |
|---|---|---|
| 1,122,167 | Southgate | Dec. 22, 1914 |
| 1,175,977 | Nolan | Mar. 21, 1916 |
| 1,906,715 | Penick | May 2, 1933 |
| 2,570,682 | Imbert | Oct. 9, 1951 |
| 2,627,443 | Becker | Feb. 3, 1953 |
| 2,660,485 | Gerard | Nov. 24, 1953 |
| 2,760,832 | Bidwell | Aug. 28, 1956 |

FOREIGN PATENTS

| | | |
|---|---|---|
| 129,404 | Sweden | Sept. 12, 1950 |